United States Patent
Dorothy et al.

(10) Patent No.: US 10,381,887 B2
(45) Date of Patent: Aug. 13, 2019

(54) END PLATE FOR ROTORS OF SWITCHED RELUCTANCE MOTORS

(71) Applicant: Caterpillar Inc., Peoria, IL (US)

(72) Inventors: Josh Dorothy, Dunlap, IL (US); Corey Allen Kauk, Otsego, MN (US); Richard Geist Auch, Peoria, IL (US); Carlos Eduardo Nino-Baron, Edwards, IL (US); Rodwan T Adra, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 120 days.

(21) Appl. No.: 15/481,513

(22) Filed: Apr. 7, 2017

(65) Prior Publication Data
US 2018/0294684 A1    Oct. 11, 2018

(51) Int. Cl.
*H02K 1/22*    (2006.01)
*H02K 1/24*    (2006.01)

(52) U.S. Cl.
CPC .............. *H02K 1/246* (2013.01); *H02K 1/24* (2013.01); *H02K 2213/03* (2013.01)

(58) Field of Classification Search
CPC .............. H02K 1/22; H02K 1/28; H02K 1/30
See application file for complete search history.

(56) References Cited

U.S. PATENT DOCUMENTS

| | | | |
|---|---|---|---|
| 1,645,070 A * | 10/1927 | Pohl | H02K 3/42 310/256 |
| 5,300,846 A | 4/1994 | Miller | |
| 5,894,183 A * | 4/1999 | Borchert | H02K 15/03 310/152 |
| 5,955,807 A * | 9/1999 | Kajiura | H02K 29/12 310/156.66 |
| 6,137,205 A * | 10/2000 | Hung | H02K 1/30 310/216.115 |
| 6,772,503 B1 * | 8/2004 | Fathimulla | H02K 1/24 29/596 |
| 8,084,902 B2 | 12/2011 | Lemmers, Jr. et al. | |
| 8,593,029 B2 * | 11/2013 | Inoue | H02K 21/048 310/156.66 |
| 8,970,085 B2 * | 3/2015 | Takahashi | H02K 1/276 310/216.114 |
| 2008/0174200 A1 * | 7/2008 | Okamoto | H02K 15/02 310/216.018 |
| 2010/0079028 A1 | 4/2010 | Turner et al. | |

* cited by examiner

*Primary Examiner* — Dang D Le
(74) *Attorney, Agent, or Firm* — Harrity & Harrity LLP

(57) ABSTRACT

An end plate for a rotor of a switched reluctance motor is disclosed. The end plate includes an annular body and a plurality of ribs. The annular body has a first axial end, a second axial end, and a thickness. Further, the annular body defines an outer surface and a bore configured to receive a shaft of the rotor. The plurality of ribs extends radially outwardly from the outer surface. The plurality of ribs is adapted to respectively abut with a plurality of poles of the rotor.

20 Claims, 6 Drawing Sheets

END PLATE FOR ROTORS OF SWITCHED RELUCTANCE MOTORS

TECHNICAL FIELD

The present disclosure relates a rotor for switched reluctance motors. More particularly, the present disclosure relates to an end plate for such rotors that is configured to support a plurality of poles of such rotors.

BACKGROUND

A switched reluctance motor (SRM) is a type of an electric motor that, depending upon an application, is operated as a motor and/or as a generator. For example, SRMs may be utilized as a generator when mechanical energy is required to be converted into electrical energy, or as a motor when electrical energy is required to be converted into mechanical energy. SRMs typically include a stator having a number of stator poles and a rotor having a number of rotor poles. The rotor is generally formed from a stack of laminations. During operation, each of the stator poles are successively excited to generate a magnetic attraction force between the stator poles and corresponding rotor poles to rotate the rotor.

For relatively large-scale applications, such as in electric drivetrains of construction machines, SRMs may be applied for enabling one or more of the machine functions. A rotor applied in such SRMs may be relatively large sized and may require a commensurately higher balance mass for enabling a balanced rotor rotation. Further, it may be a challenge to accommodate such large-sized rotors in an already constrained space that is generally afforded in such machines. Moreover, during a handling of such relatively large sized rotors, the laminations of the rotor e prone to damage.

U.S. Pat. No. 8,084,902 relates to an end plate that is generally cylindrical and has a central bore to receive a rotor shaft. The end plate has a radially inner boss and a radially outer boss. The radially outer boss is positioned radially outwardly of windings in a generator. The radially inner boss is positioned radially inwardly of the windings in a generator.

SUMMARY OF THE INVENTION

In one aspect, the disclosure is directed towards an end plate for a rotor of a switched reluctance motor. The end plate includes an annular body and a number of ribs. The annular body has a first axial end, a second axial end, and a thickness. Further, the annular body defines an outer surface and a bore configured to receive a shaft of the rotor. The ribs extend radially outwardly from the outer surface. The ribs are adapted to respectively abut with a plurality of poles of the rotor.

In another aspect, the disclosure relates to a rotor assembly for a switched reluctance motor. The rotor assembly includes a rotor and an end plate. The rotor includes a rotor core that defines an end face. Further, the rotor includes multiple poles that extend radially outwardly from the rotor core. The end plate is engaged to the end face. The end plate includes an annular body and a number of ribs. The annular body has a first axial end, a second axial end, and a thickness. Further, the annular body defines an outer surface. The ribs extend radially outwardly from the outer surface and are respectively abutted with the poles.

In yet another aspect, the present disclosure is directed towards a switched reluctance motor. The switched reluctance motor includes a rotor and an end plate. The rotor includes a rotor core and a number of poles. The rotor core defines an end face. The poles extend radially outwardly from the rotor core. The end plate is engaged to the end face. The end plate includes an annular body and a number of ribs. The annular body has a first axial end, a second axial end, and a thickness. The annular body also defines an outer surface. Further, the ribs extend radially outwardly from the outer surface, and are respectively abutted with the poles.

DETAILED DESCRIPTION

Reference will now be made in detail to embodiments of the present disclosure, examples of which are illustrated in the accompanying drawings. Wherever possible, the same or similar reference numbers will be used throughout the drawings to refer to the same or like parts.

Figure 1:
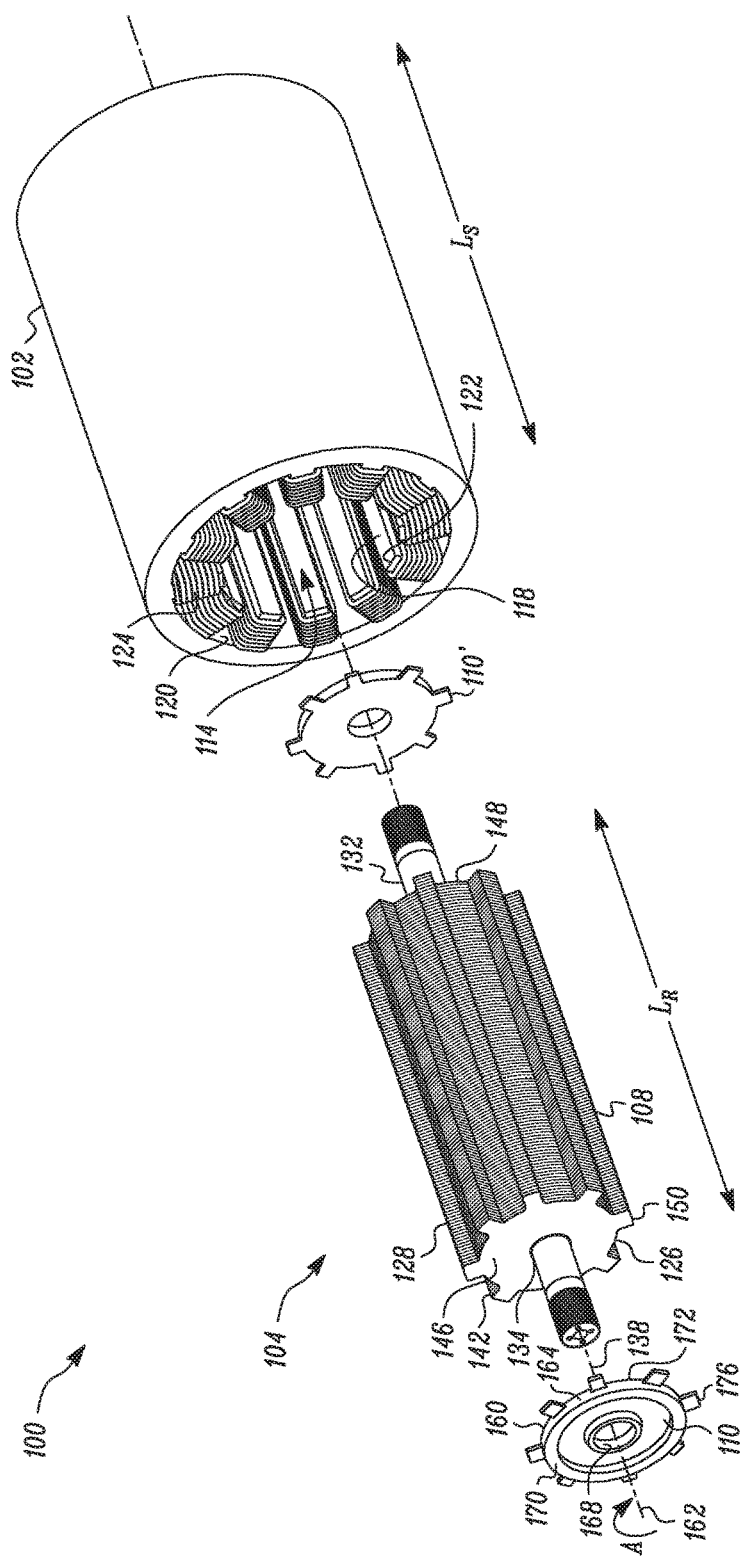
FIG. 1 is an exploded view of a switched reluctance motor, having a rotor and an endplate for the rotor, in accordance with the concepts of the present disclosure.

Referring to FIG. 1, an electric motor 100 is shown. According to an aspect of the present disclosure, the electric motor 100 is a switched reluctance motor, and therefore, the electric motor 100 may be interchangeably referred to as a switched reluctance motor 100. The switched reluctance motor 100 includes stator 102 and a rotor assembly 104. The rotor assembly 104 includes a rotor 108 and a set of end plates, categorized into a first end plate 110 and a second end plate 110'. Details of the rotor 108 and the end plates 110, 110' will be discussed later in the application. It may be noted that the switched reluctance motor 100 is applicable in machines, such as those that are propelled by an electric drivetrain, and where the switched reluctance motor 100 may power one or more applications of the electric drivetrain. Nevertheless, aspects of the present disclosure need not be seen as being limited to such machines, and a variety of other machines and applications may also employ one or more of the aspects that will described below.

The stator 102 may include a cylindrical structure, and may be formed from a stack of laminations, as is well known. The stator 102 may include an interior surface 120 that may be cylindrical in profile. A number of stator poles 118 of the stator 102 may be rotationally arrayed on the interior surface 120, with each stator pole 118 having a linear extension that is defined along a length, $L_S$, of the stator 102. It may be noted that only one stator pole 118 is denoted in FIG. 1 for clarity. Additionally, the stator poles 118 may protrude from the interior surface 120 radially inwardly into a hollow of the stator 102, such that ends 122 of the stator poles 118 may define a hollow, circular space 114 within the stator 102. This circular space 114 may extend throughout the length, $L_S$, of the stator 102. In the depicted example of FIG. 1, the stator poles 118 are 12 in number, although a variation to this number is possible. In one example, the stator poles 118 are adapted to receive power or current (such as a direct current) from a power source (not shown) and generate a rotating magnetic field within the circular space 114. Such a rotating magnetic field may be configured to generate torque via magnetic reluctance for a rotation of the rotor 108, during operations (see exemplary arrow, A). Further, during operations, the stator 102 may be adapted to be stationed in a fixed relationship relative to a rotation of the rotor 108.

Figure 2:
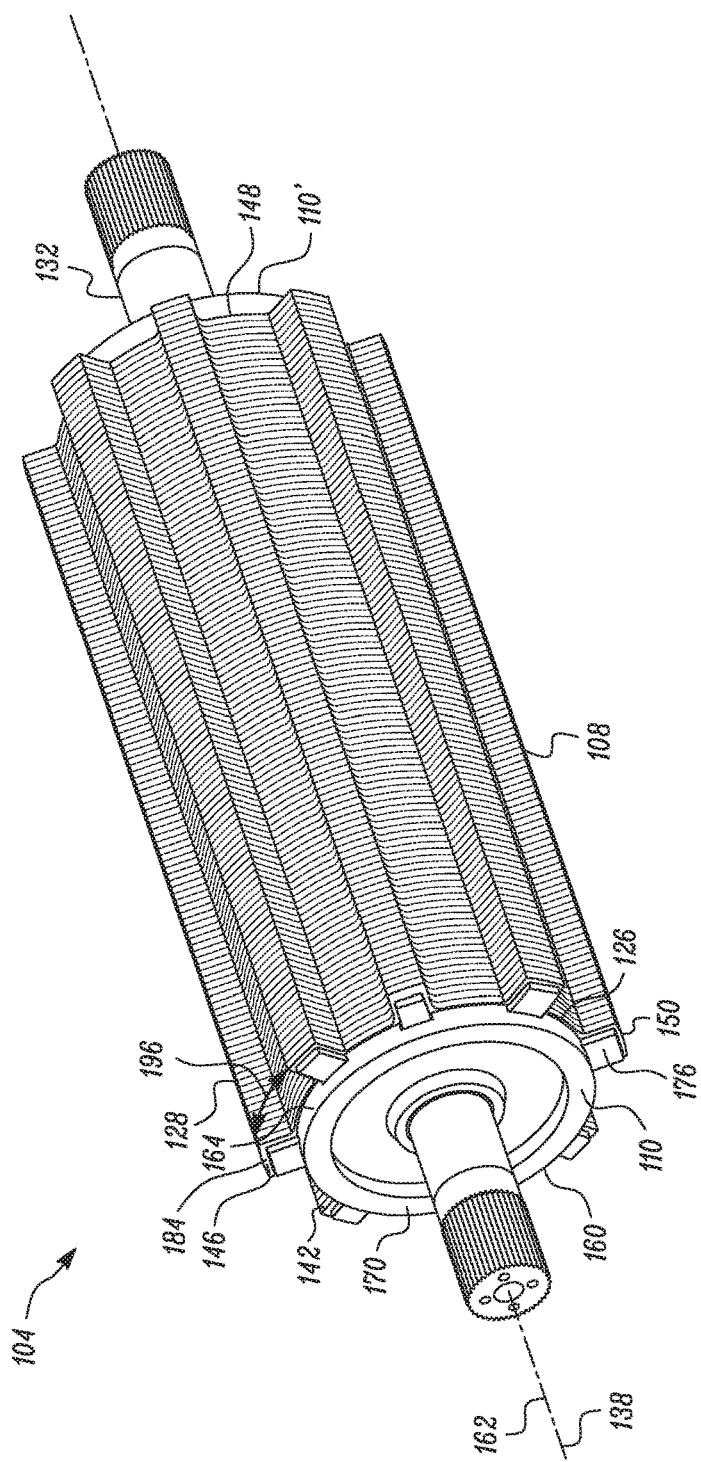
FIG. 2 is an enlarged view of the rotor of FIG. 1, in accordance with the concepts of the present disclosure.

Referring to FIGS. 1 and 2, details of the rotor 108 will now be described. The rotor 108 is adapted to be accommodated within the circular space 114 of the stator 102. The rotor 108 may be adapted to rotate relative to the stator 102 upon an interaction of the rotor 108 with the rotating magnetic field generated by the stator 102. The rotor 108 may be substantially cylindrical in structure so as to comply with and be positioned within the circular space 114. The rotor 108 may include a rotor core 126 and a number of poles 128. For reference, the poles 128 may be referred to as rotor poles 128.

The rotor 108 may also include a shaft 132, such as a rotor shaft that is positionable though an opening 134 (visualized in FIGS. 1 and 2) of the rotor 108. In some implementations, the shaft 132 may be press fitted or shrink fitted into the opening 134 of the rotor core 126. The shaft 132 may guide and facilitate a rotation (see exemplary arrow, A) of the rotor 108 relative to the stator 102 about an axis of rotation 138. Details of such a guidance provided by the shaft 132 for a working and rotation of the rotor 108 is well known, and thus will not be discussed any further.

In an assembly of the rotor 108 with the stator 102, the rotor poles 128 may be offset relative the stator poles 118 by an annular air gap 140 (best shown in FIG. 6), allowing the rotor poles 128 to move relative to the stator poles 118, and in turn allowing the rotor 108 to rotate relative to the stator 102. Similar to the arrangement of the stator poles 118 on the stator 102, the rotor poles 128 may also linearly extend along a length, $L_R$, of the rotor 108. Further, the rotor poles 128 may be rotationally arrayed around the rotor core 126, and may protrude radially outwardly from the rotor core 126.

The rotor 108 is formed from a plurality of laminations 142 that are successively stacked. One exemplary schematic depiction of a single lamination 142 has been provided in FIG. 3. In some implementations, the rotor 108 has approximately 10, 20, 50, or more or less laminations 142. In some implementations, each lamination 142 is substantially circular shaped to impart the substantial cylindrical shape to the rotor 108. In one example, either sides of each lamination 142 may be configured to be electrically insulated from each adjoining lamination. However, a perimeter of each lamination 142 may be exposed to the magnetic field generated by the stator 102 so as to allow the rotor poles 128 to interact with the magnetic field and rotate about the axis of rotation 138. Such an insulation may reduce eddy currents that result from the induced magnetic field from the stator poles 118, during operations, thereby reducing inductive heating and energy loss of the rotor 108. Although not limited, a thickness of each lamination 142 of the rotor 108 may take a value in a range of 0.3 to 0.4 millimeters (mm).

Further, the rotor 108 may define a first end face 146 and a second end face 148. The second end face 148 may be axially (i.e. along the axis of rotation 138) opposed to the first end face 146. Each lamination 142 of the plurality of laminations 142 may define radially outwardly extending set of teeth 150 (see also FIG. 3). A set of teeth 150 may comprise multiple teeth. For example, the teeth 150 are 8 in number for each lamination 142, although a lesser or a higher number for teeth 150 are possible. During an assembly of the rotor 108, the set of teeth 150 of each lamination 142 may align with a set of teeth of a successive lamination, thereby forming the multiple rotor poles 128. Given that the teeth 150 are 8 in number in the exemplary depictions provided in FIGS. 1 and 2, a number of rotor poles 128 may also be 8. Moreover, given that the teeth 150 radially extend outwardly on each lamination 142, the rotor poles 128 are also radially extended from the rotor core 126. A higher or a lower number of rotor poles 128 may however be contemplated depending upon a number of teeth 150. In some implementations, the number of rotor poles 128 of the rotor 108 may be lesser than a number of stator poles 118 of the stator 102.

Figure 3:
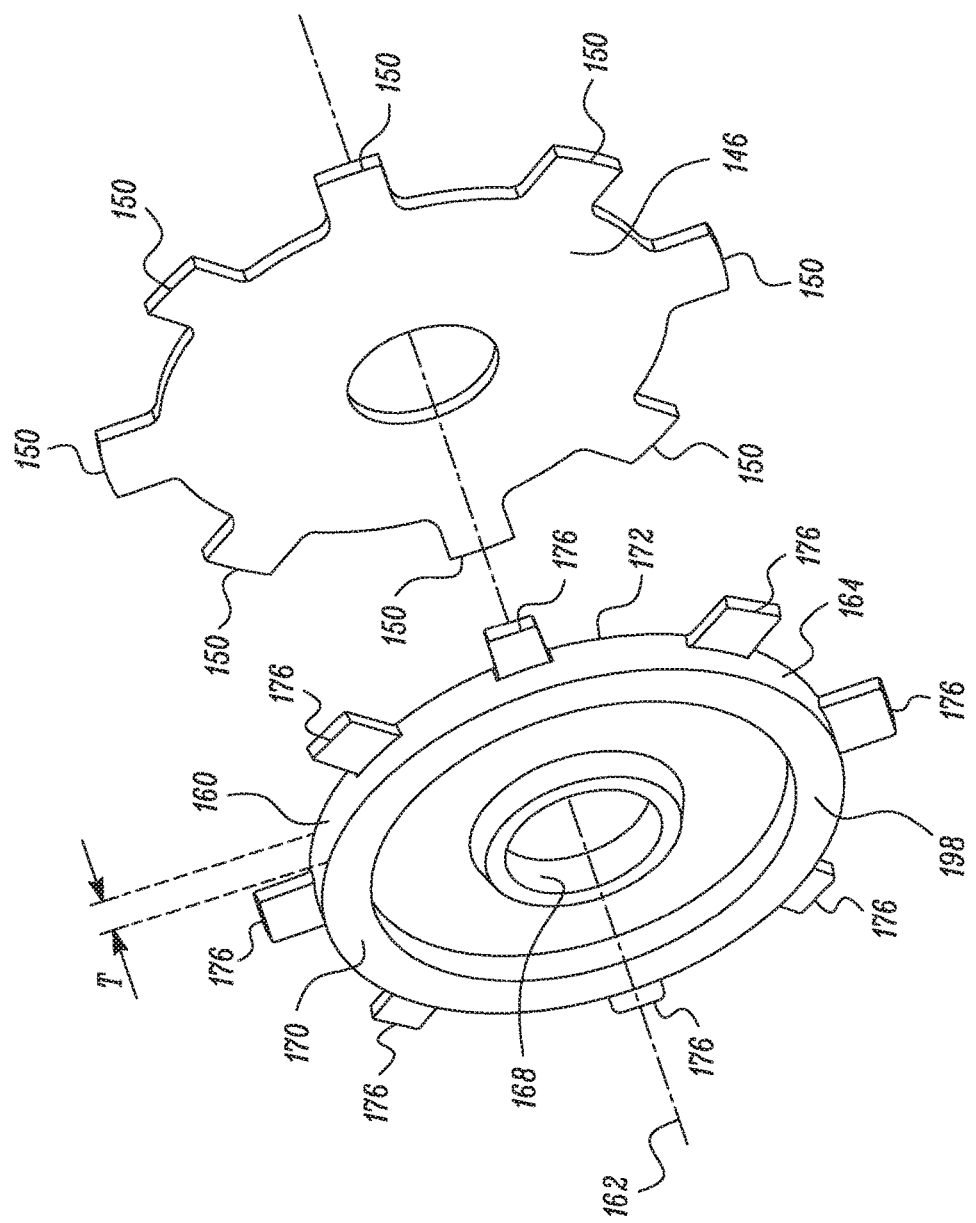
FIG. 3 is an enlarged view of the end plate of FIG. 1 and an end face of the rotor that is exemplarily depicted by way of a lamination of the rotor, with certain surrounding components removed, in accordance with the concepts of the present disclosure.

Referring to FIGS. 2 and 3, the end plates 110, 110' are discussed. The first end plate 110 and the second end plate 110' are configured to contain and axially stack the laminations 142 of the rotor 108 as a single unit. A further discussion pertaining to the end plates 110, 110' may be discussed by focusing on the first end plate 110 alone, and such description may be applicable to the second end plate 110' as well. For ease in reference, the first end plate 110 may be simply referred to as an end plate 110, and moreover, the first end face 146 of the rotor 108 may also be simply referred to as an end face 146. In addition, it may also be noted that an assembly of the second end plate 110' to the second end face 148 may remain similar to a description of be end plate 110 to the end face 146, as will be noted below.

Referring to FIG. 3, the end plate 110 includes an annular body 160 that is substantially cylindrical in structure. The annular body 160 defines a central axis 162 and a peripheral surface 164 that is defined around the central axis 162. Notably, the peripheral surface 164 is also a circumferential surface of the annular body 160, that may be referred to as an outer surface 164, hereinafter. Further, the annular body 160 of the end plate 110 is adapted to be mounted to the end face 146 (see end face 146 depicted in FIG. 3 by way of a single lamination 142), such that the end plate 110 is co-axial with the rotor 108 (see FIGS. 1, 2, and 3). For example, upon an assembly of the end plate 110 with the rotor 108, the central axis 162 may be in line or co-axial with the axis of rotation 138, as shown in FIGS. 1 and 2.

The annular body 160 also includes a bore 168 that s aligned with the central axis 162 when the end plate 110 is assembled against the end face 146 of the rotor 108. The bore 168 may be configured to receive the shaft 132, and as with the assembly of the shaft 132 with the rotor core 126, the shaft 132 may be press fitted and/or shrunk fitted inside the bore 168, as well. The annular body 160 of the end plate 110 includes a thickness, T, and a first axial end 170 and a second axial end 172, as shown. In some implementations, the thickness, T, extends between the first axial end 170 and the second axial end 172 of the end plate 110. Upon a mounting of the annular body 160 to the end face 146, the second axial end 172 may be directed towards the end face 146.

Further, the end plate 110 includes a number of ribs 176 at the second axial end 172. The ribs 176 extend radially outwardly from the outer surface 164. For example, the ribs 176 are integrally formed with the annular body 160 of the end plate 110, although it is possible to have the ribs 176 coupled to the end plate 110 by welding, or by other known fastening means. The ribs 176 are adapted to respectively abut with the rotor poles 128 during an assembly of the end plate 110 with the rotor 108. Since the rotor poles 128 are exemplarily 8 in number in the depicted embodiment, the ribs 176 may also be exemplarily 8 in number, with each rib 176 abutting and engaging a corresponding rotor pole 128. In some implementations, therefore, a number of the ribs 176 is equal to a number of the rotor poles 128.

During a manufacturing of the rotor 108, the end plate 110 may be abutted, coupled, and engaged, against the end face 146 by casting the rotor 108 and the end plate 110 in the same mold, for example. In some implementations, the end plate 110 is engaged to the end face 146 by a compression force. Such a compression force may be retained by an interference fit between the shaft 132 and the end plate 110. The thickness, T, of the end plate 110 and the corresponding amount of interference fit between the shaft 132 and end plate 110 may define an amount of axial retention force on the rotor core 126. In some instances, additional axial retention means in substitute or in addition to the interference fit between the shaft 132 and the end plate 110 may be used. Such additional axial retention means may include C-clips or other well-known axial retention means, for example.

In some implementations, the end plate 110 may be constructed from a non-magnetic material to prevent the end plate 110 from affecting an electromagnetic performance of the switched reluctance motor 100 by reducing pole saliency and causing a reduction in the aligned to unaligned inductance of the switched reluctance motor 100. In one embodiment, the end plate 110 is made of aluminum or gray iron. In some implementations, the end plate 110 is made of an alloy, such as brass. In accordance with one embodiment of the present disclosure, the end plate 110 is made of a material that has a density that is relatively higher than conventionally applied end plate materials, such as steel, alloys such as brass, etc. For example, the material of the end plate 110 is ductile iron. In still other embodiments, other materials, having a similar a higher) density, may also be applied.

In some implementations, the end plate 110 is adapted to balance a mass of the rotor 108 during a rotation of the rotor 108. More particularly, a balancing may be attained by either adding or removing a mass from the thickness, T, of the end plate 110, at one or more appropriate angular and radial locations of the end plate 110. For example, a balanced annular body 160 (i.e. the end plate 110) may be obtained from a base material of ductile iron from which portions may be removed. A removal may be obtained by shaping, turning, etc., for example, to arrive at the end plate 110 of the present disclosure. In other embodiments, rotor balance may be achieved by an addition of mass to the end plate 110. In cases of an addition of mass to the end plate 110, the end plate 110 may have features such as drilled and tapped holes (not shown) that provide for the incorporation of additional mass to the rotor 108 at locations that achieve rotor balance. In one example, these locations may be defined around a perimeter of the end plate 110.

Figure 6:
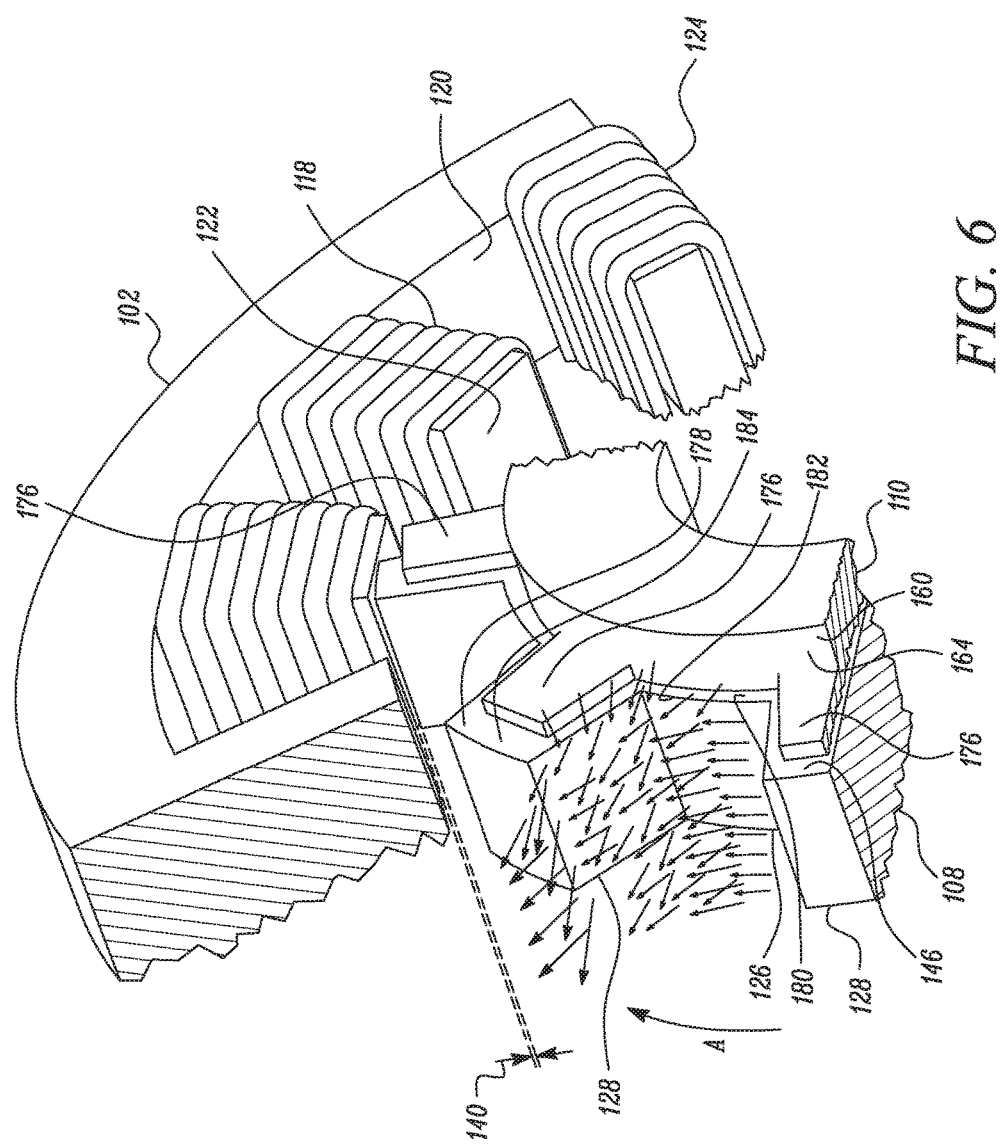
FIG. 6 is a sectional view of the switched reluctance motor of FIG. 1, depicting an interaction between the rotor and a stator of the switched reluctance motor, in accordance with the concepts of the present disclosure.

Referring to FIGS. 2 and 6, the ribs 176 may be configured to partially overlap over the rotor poles 128, and respectively abut with the rotor poles 128, at the end face 146. For example, the ribs 176 may be structured so that the ribs 176 respectively cover only a portion of the teeth 150 (or the rotor poles 128) at the end face 146. To this end, the ribs 176 have a smaller area (or a smaller perimeter) than an area (or a perimeter) defined by the respective rotor poles 128 (or teeth 150), at the end face 146. Upon an assembly of the end plate 110 to the end face 146, the ribs 176 may respectively, only partly cover an area of the rotor poles 128 at the end face 146. In so doing, each rib 176 leaves a surrounding area or an outer pole area 178 of a corresponding rotor pole 128 at the end face 146 uncovered or exposed (see FIG. 6). Further, a diameter of the annular body 160 (or the outer surface 164) of the end plate 110 may be lesser than a diameter of the rotor core 126. Therefore, upon an assembly of the end plate 110 to the end face 146, an outer rotor core area 180 may remain uncovered or exposed as well, as shown. In brevity, in order to achieve maximum electrical performance and minimize losses in the rotor end plate, the diameter of the end plate 110 (or the outer surface 164) may extend no further than a root 182 of each rotor tooth (or rotor pole 128). Both the outer rotor core area 180 and the outer pole area 178 may be contiguous and may together define an outline 184 of the lamination 142 around the end plate 110 that may be visualized from the first axial end 170 (see FIG. 2).

Figure 4:
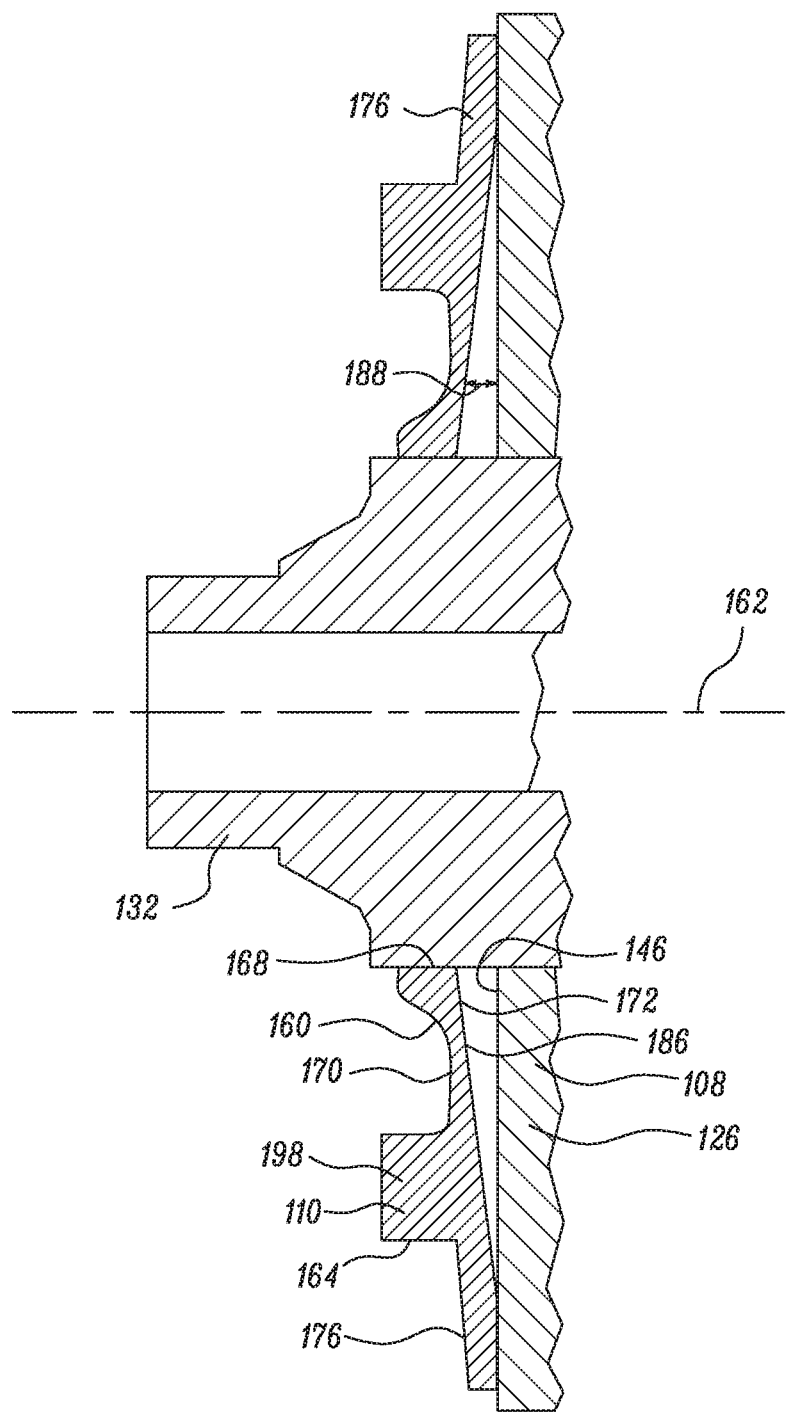
FIG. 4 is a cross-sectional view of the rotor assembly, indicating a profile of the end plate, in accordance with the concepts of the present disclosure.
Figure 5:
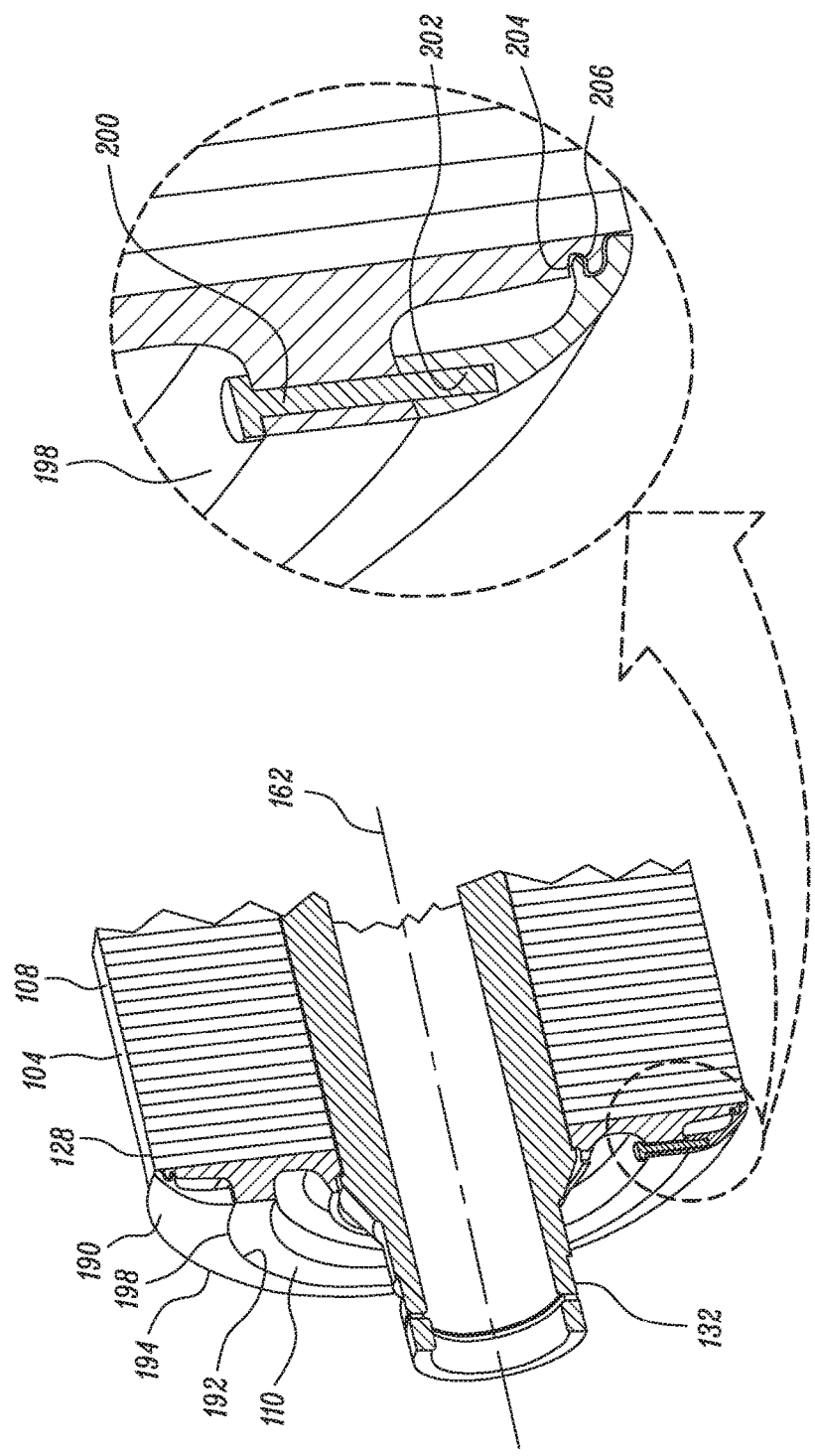
FIG. 5 is a sectional view of the rotor assembly depicting an end cap of the rotor assembly, in accordance with the concepts of the present disclosure.

Additionally, or optionally, the second axial end 172 of the end plate 110 may include a plate end face 186 that is substantially concave as shown in FIG. 4. More particularly, the plate end face 186 includes a taper that extends in a radial direction (i.e. radially outwardly) from the central axis 162 of the annular body 160. The taper enables the end plate 110 to provide a retention force on the laminations of the rotor 108. For example, the end plate 110 may taper from the second axial end 172 and converge towards the first axial end 170, imparting concavity to the end plate 110 at the second axial end 172. In that manner, upon an assembly of the end plate 110 to the rotor 108, the plate end face 186 may define a gap 188 with the end face 146 that decreases in a radial direction relative to the end plate 110, from the bore 168 towards the outer surface 164 of the annular body 160. In some implementations, such a taper of the end plate 110 enables and provides a concentration of a retention force applied by the end plate 110 on the outer diameter of the rotor core 126, and thus on the rotor poles 128.

Additionally, or optionally, the rotor assembly 104 may include an end cap 190 that may be coupled and assembled to the end plate 110. The end cap 190 may be in the form of a continuous, uninterrupted ring that is adapted to extend over and cover the rotor poles 128 at the end face 146, and also cover the ribs 176. In so doing, arcuate spaces 196 (see FIG. 2) that are rotationally defined around the rotor core 126, between successive rotor poles 128, at the end face 146, are also covered by the end cap 190. As a result, the end cap 190 is configured to cover the ribs 176 of the end plate 110 and block off the circular space 114 from receiving outside air. This is helpful since a volume of air inside the circular space 114 may act against a rotation of the rotor poles 128 during operations, thereby generating drag and windage losses.

The end cap 190 may define an inner periphery 192 and an outer periphery 194. In an assembled position of the end cap 190 with the end plate 110, the end cap 190 may be retained against a rim portion 198 of the end plate 110 at the inner periphery 192. For example, such a retention may be facilitated by one or more fasteners 200 such as bolts, as shown. As shown in the depicted embodiment, the fasteners 200 may be driven through a thickness of the rim portion 198 in a radial direction of the end plate 110 and be inserted into one or more openings 202 formed within a body of the end cap 190. Further, the outer periphery 194 may be retained to the ribs 176. For a retention of the outer periphery 194 to the ribs 176, the end cap 190 may include one or more extension members 204 that may be inserted and be snap-fitted into one or more notches 206 formed in the ribs 176. In some implementations, the end cap 190 may be formed from a non-metallic material, such as a high-grade plastic, or there may be an addition of non-metallic fillers (not shown) on the rotor core 126 to minimize windage losses.

INDUSTRIAL APPLICABILITY

Referring to FIGS. 1-6, an operation of the switched reluctance motor 100 will now be discussed. During operation, power from a power source is supplied to the stator 102 (or to the stator windings 124, see FIGS. 1 and 6) that generates a rotating magnetic field (see arrows, FIG. 6) within the stator 102. (or the circular space 114 within the stator 102). In turn, the magnetic field generates a rotational torque against the rotor poles 128 so that the rotor poles 128 move relative to the stator poles 118, achieving rotor rotation about the axis of rotation 138 (see exemplary arrow, A). As the diameter of the annular body 160 (or the outer surface 164) of the end plate 110 is smaller than a diameter of the rotor core 126 (i.e. the outer surface 164 is below the root 182 of the teeth 150 at the end face 146), an interaction between the magnetic field and the end plate 110 is relatively less, thus leading to lesser heat generation and lesser electromagnetic losses from the end plate 110. Moreover, because the ribs 176 may extend only partly over the teeth 150 of the laminations 142 (or over the rotor pole 128) at the end face 146, an interaction of the end plate 110 with the magnetic field is further reduced, and thus electromagnetic losses are further mitigated. Such a partial extension of the ribs 176 over the rotor poles 128 (or over the teeth 150 of the lamination 142) at the end face 146 also provides a reinforcement to the teeth 150 at the end face 146 and prevents the teeth 150 from damages that may be sustained during rotor handling.

Further, when a production of the end plate 110 includes a removal of material from the end plate 110 for balancing the rotor 108, a relatively dense material for the end plate 110 may be preferred. Ductile iron has an approximate density of 7.3 grams/cubic centimeter, and a usage of ductile iron as a material for the end plate 110 may help the end plate 110 achieve a higher balance mass for a relatively shorter thickness, T, or a smaller diameter, or in general a reduced end plate footprint. A resulting reduced footprint of the end plate 110 within the switched reluctance motor 100 allows an effective usage of a space or a real estate that is generally a scarcity in large-sized switched reluctance motors. Since a footprint is less, a cost of incorporating the end plate 110 is also commensurately less. Moreover, ductile iron absorbs a lesser magnitude of the magnetic field generated by the stator 102, further refraining the end plate 110 from an interaction with the magnetic field and causing the end plate 110 to generate lesser heat and thus lesser electromagnetic losses.

It should be understood that the above description is intended for illustrative purposes only and is not intended to limit the scope of the present disclosure. Thus, one skilled in the art will appreciate that other aspects of the disclosure may be obtained from a study of the drawings, the disclosure, and the appended claim.

What is claimed is:

1. An end plate for a rotor, the end plate comprising:
an annular body having a first axial end, a second axial end, and a thickness,
the annular body defining an outer surface and a bore configured to receive a shaft of the rotor; and
a plurality of ribs extending radially outwardly from the outer surface,
the plurality of ribs being adapted to respectively abut with a plurality of poles of the rotor,
at least one of the plurality of ribs or the plurality of poles being covered by an end cap, and
an area of a rib, of the plurality of ribs, being smaller than an area of a pole of the plurality of poles.

2. The end plate of claim 1,
wherein the rotor defines an end face, and
wherein the plurality of ribs are configured to partially overlap over the plurality of poles at the end face.

3. The end plate of claim 1,
wherein the rotor includes a plurality of laminations,
the end plate including a plate end face at the second axial end,
the plate end face including a taper extending radially outwardly from a central axis of the annular body, and
the taper enabling the end plate to provide a retention force on the plurality of laminations.

4. The end plate of claim 1, wherein the end plate is formed of ductile iron.

5. The end plate of claim 1,
wherein the end plate is adapted to balance a mass of the rotor, and
wherein balancing the mass of the rotor is attained by one of adding or removing a mass from the thickness at one or more angular and radial locations of the end plate.

6. The end plate of claim 1,
wherein the rotor includes a rotor core,
the plurality of poles extending radially outwardly from the rotor core, and
wherein a diameter of the outer surface is smaller than a diameter of the rotor core.

7. A rotor assembly comprising:
a rotor including:
a rotor core defining an end face; and
a plurality of poles extending radially outwardly from the rotor core; and
an end plate engaged to the end face,
the end plate including:
an annular body having a first axial end, a second axial end, and a thickness,
the annular body defining an outer surface and a bore; and
a plurality of ribs extending radially outwardly from the outer surface,
the plurality of ribs being adapted to respectively abut with the plurality of poles, and
the plurality of ribs and the plurality of poles being covered by an end cap.

8. The rotor assembly of claim 7, further including the end cap,
wherein arcuate spaces, defined between successive poles of the plurality of poles, are covered by the end cap.

9. The rotor assembly of claim 7,
wherein the end plate further includes a plate end face facing the end face of the rotor core,
the plate end face including a taper extending in a radial direction from a central axis of the annular body, and
wherein the taper defines a gap with the end face that decreases in a radial direction relative to the end plate, from the bore towards the outer surface of the annular body.

10. The rotor assembly of claim 7, wherein the end plate is formed of ductile iron.

11. The rotor assembly of claim 7,
wherein the end plate is adapted to balance a mass of the rotor, and
wherein balancing the mass of the rotor is attained by one of adding or removing a mass from the thickness at one or more angular and radial locations of the end plate.

12. The rotor assembly of claim 7, wherein a diameter of the outer surface is smaller than a diameter of the rotor core.

13. The rotor assembly of claim 7, wherein the plurality of ribs partially overlap over the plurality of poles at the end face.

14. The rotor assembly of claim 7, wherein the rotor is formed by a plurality of laminations that are successively stacked,
each lamination of the plurality of laminations defining radially outwardly extending set of teeth, and
the set of teeth of each lamination aligning with a set of teeth of a successive lamination to form the plurality of poles.

15. A switched reluctance motor, comprising:
a rotor including:
a rotor core defining an end face; and
a plurality of poles extending radially outwardly from the rotor core; and
an end plate engaged to the end face,
the end plate including:
an annular body having a first axial end, a second axial end, and a thickness, the annular body defining an outer surface; and
a plurality of ribs extending radially outwardly from the outer surface,
wherein the plurality of ribs are respectively abutted with the plurality of poles, and
wherein at least one of the plurality of ribs or the plurality of poles is covered by an end cap.

16. The switched reluctance motor of claim 15, further including:
the end cap,
the end cap being coupled to the end plate, and
the end cap being adapted to cover the plurality of ribs, the plurality of poles, and
arcuate spaces defined between successive poles of the plurality of poles.

17. The switched reluctance motor of claim 15, wherein the end plate is formed of ductile iron.

18. The switched reluctance motor of claim 15,
wherein the end plate is adapted to balance a mass of the rotor,
wherein balancing the mass of the rotor is attained by one of adding or removing a mass from the thickness at one or more angular and radial locations of the end plate.

19. The switched reluctance motor of claim 15, wherein a diameter of the outer surface is smaller than a diameter of the rotor core.

20. The switched reluctance motor of claim 15, wherein the plurality of ribs partially overlap over the plurality of poles at the end face.

* * * * *